(12) United States Patent
Lübker et al.

(10) Patent No.: US 11,530,681 B2
(45) Date of Patent: Dec. 20, 2022

(54) USE OF A NEW MATERIAL IN WIND TURBINE PARTS AND APPARATUS AND METHODS THEREOF

(71) Applicant: Ventus Engineering GmbH, Vienna (AT)

(72) Inventors: Poul Anker Skaarup Lübker, Baar (CH); Shavkat Mingaliev, Vienna (AT)

(73) Assignee: Ventus Engineering GmbH, Vienna (AT)

( * ) Notice: Subject to any disclaimer, the term of this patent is extended or adjusted under 35 U.S.C. 154(b) by 275 days.

(21) Appl. No.: 16/652,305

(22) PCT Filed: Oct. 2, 2018

(86) PCT No.: PCT/EP2018/076808
§ 371 (c)(1),
(2) Date: Mar. 30, 2020

(87) PCT Pub. No.: WO2019/068721
PCT Pub. Date: Apr. 11, 2019

(65) Prior Publication Data
US 2020/0240391 A1    Jul. 30, 2020

(30) Foreign Application Priority Data
Oct. 2, 2017    (EP) .................................... 17194393

(51) Int. Cl.
*F03D 1/06*    (2006.01)
*F03D 13/20*    (2016.01)
(Continued)

(52) U.S. Cl.
CPC ............ *F03D 1/0675* (2013.01); *B32B 27/32* (2013.01); *B32B 27/40* (2013.01); *E04H 12/12* (2013.01);
(Continued)

(58) Field of Classification Search
CPC ........ F03D 1/0675; F03D 13/20; F03D 80/50; B32B 27/32; B32B 27/40; B32B 2255/10;
(Continued)

(56) References Cited

U.S. PATENT DOCUMENTS

2009/0211173 A1    8/2009    Willey et al.
2016/0151932 A1*    6/2016    Peixoto .................... B28B 1/14
                                                264/278
(Continued)

FOREIGN PATENT DOCUMENTS

CN    101539095 A    9/2009
CN    104502631 A    4/2015
(Continued)

OTHER PUBLICATIONS

Anonimous: "Enhancing Composite Materials with Functionalized Graphene & CNTs Haydale Technologies Thailand (HTT)", Nov. 9, 2016 (Nov. 9, 2016), XP055464605, Retrieved from the Internet <URL:http://www.graphenemalaysiaconf.com/FILES/Presentations/GrapheneMalaysia2016_Frantz.pdf>.
(Continued)

*Primary Examiner* — Aaron R Eastman
(74) *Attorney, Agent, or Firm* — Dykema Gossett PLLC

(57) ABSTRACT

The present invention relates to a wind turbine blade with a blade structure comprising a surface and a load-carrying spar supporting a shell structure, wherein the blade structure comprises functionalized graphene-containing material. The present invention relates to a wind turbine concrete tower comprising a load-carrying structure extending vertically to a height, comprising functionalized graphene-containing material. The invention further relates to use of functionalized graphene-containing material in wind turbine parts. The invention further relates to a method for retrofitting a blade structure and the use of functionalized graphene-containing
(Continued)

material in a repair system for wind turbine tower foundations. Furthermore the invention relates to use of at least one sensor containing graphene.

12 Claims, 5 Drawing Sheets

(51) Int. Cl.
  *F03D 80/50* (2016.01)
  *B32B 27/32* (2006.01)
  *B32B 27/40* (2006.01)
  *E04H 12/12* (2006.01)

(52) U.S. Cl.
  CPC ............ *F03D 13/20* (2016.05); *F03D 80/50* (2016.05); *B32B 2255/10* (2013.01); *B32B 2255/20* (2013.01); *B32B 2603/00* (2013.01)

(58) Field of Classification Search
  CPC . B32B 2255/20; B32B 2603/00; E04H 27/40; F05B 2280/2006; Y02E 10/72; Y02E 10/728
  See application file for complete search history.

(56) References Cited

U.S. PATENT DOCUMENTS

| | | | |
|---|---|---|---|
| 2016/0093751 A1 | 7/2016 | Humfield | |
| 2016/0193751 A1* | 7/2016 | Humfeld | B82Y 30/00 156/181 |
| 2016/0348391 A1* | 12/2016 | Zavitz | E04H 12/342 |
| 2017/0089090 A1* | 3/2017 | Díez Cornejo | E04H 12/16 |
| 2019/0270261 A1* | 9/2019 | Randall | B29C 70/342 |
| 2019/0383274 A1* | 12/2019 | Girolamo | B32B 37/00 |
| 2020/0061970 A1* | 2/2020 | Chen | F41H 1/02 |
| 2020/0263657 A1* | 8/2020 | Badger | F03D 80/30 |
| 2020/0361612 A1* | 11/2020 | Bonaccurso | B32B 3/10 |
| 2021/0078309 A1* | 3/2021 | Chen | F41H 5/0492 |

FOREIGN PATENT DOCUMENTS

| | | |
|---|---|---|
| CN | 105505095 A | 4/2016 |
| CN | 105856586 A | 8/2016 |
| CN | 104 502 631 B | 6/2017 |
| EP | 2891793 A1 | 7/2015 |
| EP | 3 186 075 A1 | 7/2017 |
| WO | 2016030170 A1 | 3/2016 |

OTHER PUBLICATIONS

Kris Walker: "Renewable Energy Embraces Graphene: Improved Wind Turbine Technology", Nov. 14, 2013 (Nov. 14, 2013), XP055464567, Retrieved from the Internet <URL:https://www.azocleantech.com/article.aspx?ArticleID=455>.

Paul Dvorak: "Graphene-reinforced composites may lead to longer, stronger blades, and more", Sep. 3, 2014 (Sep. 3, 2014), XP055464563, Retrieved from the Internet <URL:https://www.windpowerengineering.com/blades/graphene-reinforced-composites-may-lead-longer-stronger-blades-2/.

Tay Gibbs: Commercializing the 'wonder material'—Aug. 18, 2017 (Aug. 18, 2017), XP055464612, Retrieved from the Internet <URL:https://physicsworld.com/a/commercializing-the-wonder-material/.

* cited by examiner

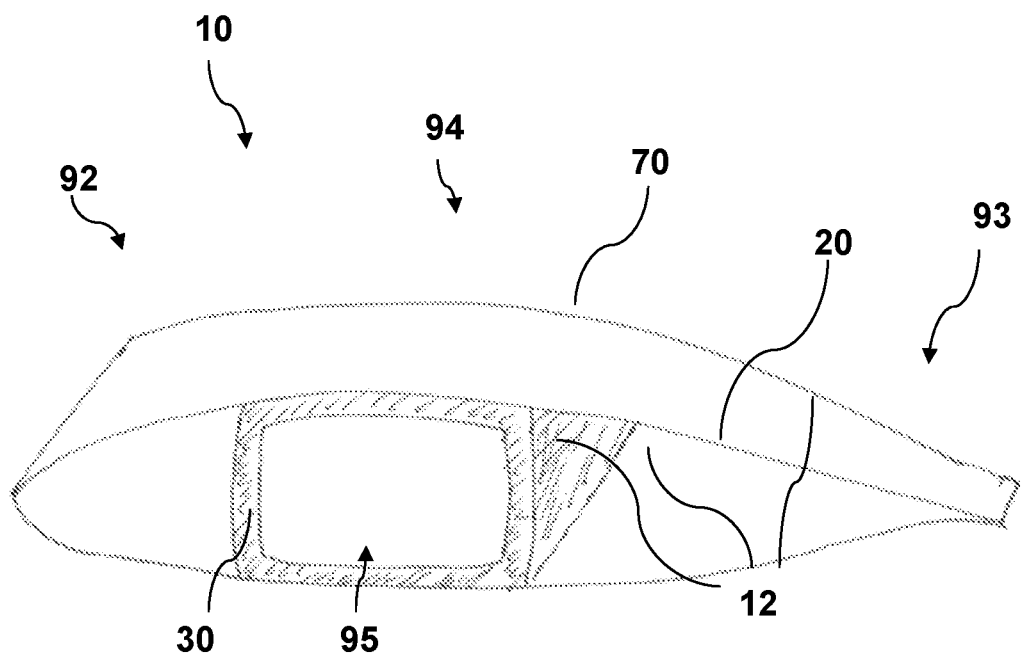
Fig. 2A
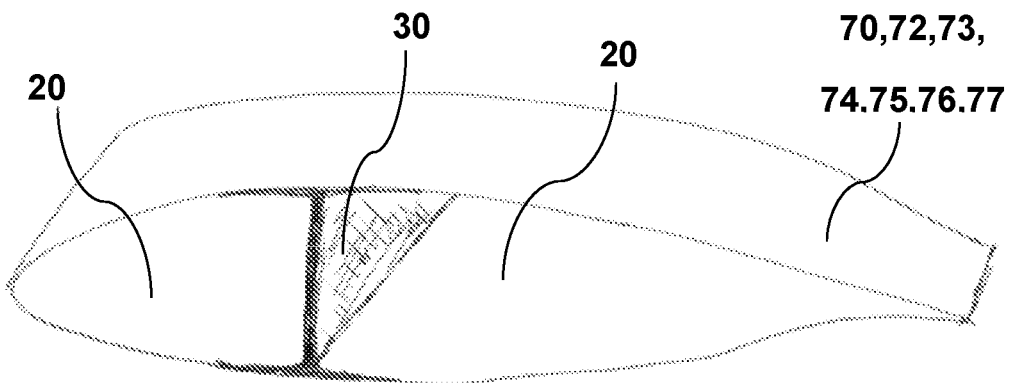
Fig. 2B
Fig. 2C
Fig. 2

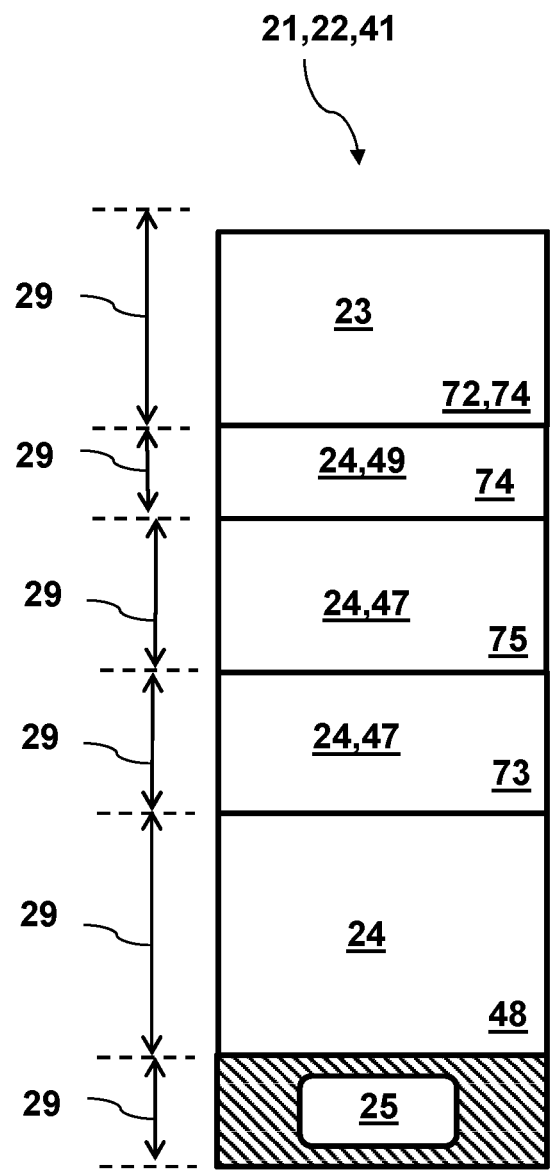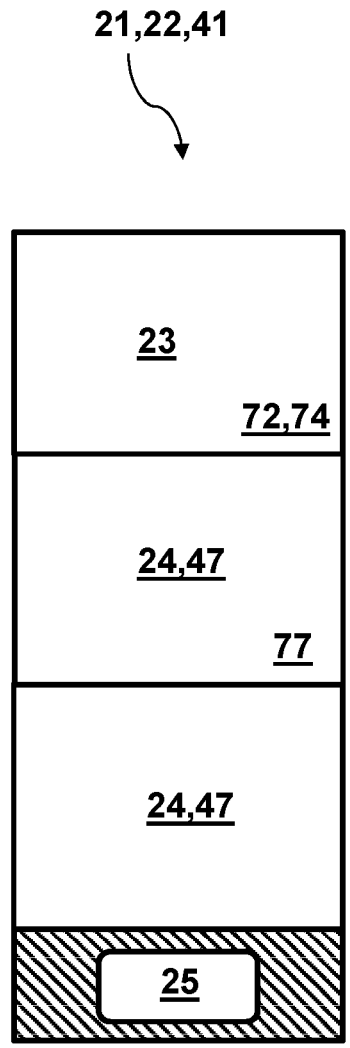
Fig. 3A)  Fig. 3B)
Fig. 3

ABSTRACT# USE OF A NEW MATERIAL IN WIND TURBINE PARTS AND APPARATUS AND METHODS THEREOF

CROSS-REFERENCE TO RELATED APPLICATIONS

This application is a national stage filing based upon International PCT Application No. PCT/EP2018/076808, filed 2 Oct. 2018, which claims the benefit of priority to European application No. 17194393.9, filed 2 Oct. 2017.

FIELD OF THE INVENTION

The present invention relates to a general concept for improving wind turbine part by use of a new material.

BACKGROUND OF THE INVENTION

The development in wind turbines continues in the pursuit of increased energy output and all components in the wind turbine are subject for enhancements including the design of the wind turbine. This pursuit for increased energy output also embraces location of the wind turbines for achieved optimal wind conditions.

The change in design of wind turbines and increased use in more hostile locations, especially offshore, creates new challenges both in terms of aerodynamics, durability and maintenance of the individual parts constituting the wind turbine and of the complete wind turbine.

One major change is being driven by a desire for longer turbine blades. The longer the blade, the more power a wind turbine can produce. Today's blades are up to 80 m in length, but the next generations are likely to reach well over 100 m.

Based on today's construction of wind turbine blades, lengthening a blade hugely increases its mass. The mass may be increased by almost a factor of three.

The size and mass of today's wind turbine blades are already approaching the point where the gravity of the blades induces the dominant load on the wind turbine compared to the load induced by the aerodynamics.

Reducing weight of the wind turbine blades has therefore become a top priority in blade design. A reduction in weight should be achieved without reduction in energy output and durability of the blades. This creates a huge challenge for those working in materials development.

The environmental conditions surrounding the wind turbine may affect the design of wind turbine blades. Especially the rise in offshore wind turbines amongst others has commenced the development in wind turbine blades. Offshore turbines experience an average wind speed of around 14 m/s off the coast of the UK, much higher than on-shore. The exposure to UV radiation combined with rain, the high humidity of the salty sea air, extreme wind conditions and high-speed spinning blades of an offshore wind turbine combine to form a highly erosive environment that far surpasses anything experienced by an aircraft. This seriously affects the durability of the wind turbine blades, towers and foundations.

Today, the blade tips on existing wind turbines may already move through the air with speeds of up to 400 km/hour.

Especially durability is a high priority property for offshore wind turbines. The remote location of offshore wind turbines brings costly repairs and maintenance of the wind turbines. Finding a way to extend the lifetime of materials is therefore a priority for the industry. Thus, some of the challenges in the wind turbine industry relates to optimizing the materials used for the individual part comprising the wind turbine in regard to durability, optimized properties in regard to the forces and environmental conditions acting on the single parts of the wind turbine and efficient production of the parts.

A major change is being driven by a desire for efficiently producing large, lightweight blades that can cope with the harsh environmental conditions in which they are operated including offshore conditions.

Another major change is being driven by a desire for increased hub height on wind turbines especially for on-shore locations. Increasing the hub height hugely increases the output from the wind turbine—each meter gained in hub height is said to increase the yearly energy yield by 0.5-1%. Today's on-shore hub height is up to 150 meter, but the next generations of on shore wind turbines are likely to reach well over 200 m. Increasing the hub height of the wind turbine has therefore also become a top priority in tower design. An increase in hub height should be achieved while improving strength of the tower with reduced weight per height meter significantly and improve the durability of the towers. This creates a huge challenge for those working in materials development.

In order to go beyond what is currently possible with traditional composites, a steep change in blade, tower and foundation design and the materials used may be needed.

However, not only new wind turbines are subject to continued development. The development in service and maintenance of existing wind turbines may also pose for a steep change in methods and material therefore to achieve continued cost-effective operation.

OBJECT OF THE INVENTION

It is an object of this invention to overcome one or more of the aforementioned shortcoming of the prior art.

DESCRIPTION OF THE INVENTION

The aforementioned aspects may be achieved by a wind turbine blade with a blade structure comprising a surface and a load-carrying spar supporting a shell structure, wherein the blade structure comprises functionalized graphene-containing material.

The load-carrying spar may also be referred to as a spar, spar web or main spar amongst others. It may be formed as a cylindrical structure, on or more bars. This is simply a few examples and the structure is by no means limited to this. The structure may also be referred to as a loadbearing structure.

A wind turbine blade comprises a leading edge, a trailing edge, a suction side and a pressure side and extends from root to tip. The pressure side may also be referred to as the upwind side and the suction side as the downwind side.

Graphene is a one-atom-thick layer of carbon atoms arranged in a honeycomb (hexagons or chicken-wire) crystal lattice.

Graphene-based materials may be functionalized with different side groups for different properties. The number of side groups per carbon atoms may differ depending on the functionalization and/or which properties to achieve. Functionalized graphene-based materials may be in dry powder form, liquid or ink—these being inexhaustible examples.

The functionalized graphene-based materials may have superior properties such as for example large surface area, mechanical stability, tuneable electrical and optical properties making it advantageous for use in wind turbines. The properties further includes that it is stronger than steel, has a thin two dimensional structure, is high conductive, high malleable, is stretchable with further properties of being transparent, flexible, hydrophobic, light absorbing, radar-absorbent and impermeable.

Graphene-based materials may be structured, designed or presented in a number of ways: Porous wherein a number of carbon atoms are lacking in the structure, it may be stacked or folded to form 3D structures, the lateral size may be varied.

Graphene-based materials and functionalized graphene-based materials may respectively be referred to as source graphene-based materials and functionalized source graphene-based materials.

A method for functionalization of the graphene-based materials may comprise the following acts:
choice of graphene-based materials,
selection of appropriate chemical side-group(s), and
level and/or density of functionalization.
This being an inexhaustible example.

Functionalized graphene-containing material may encompass one or more functionalized graphene-containing material(s).

Functionalized graphene-based materials are extremely diverse materials, and may be embedded in a matrix additive host/carrier material to be used in material compositions matrix of intermediate or host/carrier materials to produce different materials with various significantly improved properties turning the mix into a high-performance functionalized graphene-containing material. The host/carrier material may have more than one functionalized graphene-containing material added, depending on which one or more properties are required to be synthesized into the functionalized graphene-containing material.

The ratio for functionalized graphene-based materials comprised in the functionalized graphene-containing material depends on the host/carrier material and the properties to be achieve for the functionalized graphene-containing material.

Correctly functionalized graphene-based materials have a unique ability to give its attributes to the matrix of intermediate or host/carrier materials. The functionalization may bring that the graphene-based materials' rough texture expands thereby creating a significant surface area. The planar structure of functionalized graphene-based materials create a significant surface inducing a large contact area with the host/carrier material because both the top and bottom surfaces of a graphene sheet are in close contact with the host/carrier material. The host/carrier material may be the material in the matrix binding to the functionalized graphene-based material.

In one aspect the graphene-based material may be functionalized to bond tightly with surrounding polymers, improving interfacial load transfers and boosts the surface area in contact with the polymers.

Moreover, the aspect ratio (ratio between a lateral dimension and the thickness of the graphene sheet) of a single graphene sheet can reach more than 2000. The surface area of a single graphene sheet can theoretically reach 2600 m2/g which may provide a significant amount of potential sites for advantageous chemical or physical interactions. This may accordingly improve bonding between graphene sheet(s) and host/carrier material.

One effect of the embodiment comprising a blade structure comprising a functionalized graphene-containing material may be that the strength, stiffness and/or toughness of the blade may be increased compared to using a non-graphene-containing material. This may enable for longer, stiffer, lighter and/or more damage-tolerant blades.

Non-graphene-containing material refers to a material not comprising functionalized graphene-based materials.

Furthermore, due to the increased strength, stiffness and/or toughness for a comparable blade comprising a functionalized graphene-containing material compared to using a non-graphene-containing material comprising material an improve stability of the blades with a lower weight of the blades may be achieved.

The increased strength, stiffness and/or toughness of the blade may further be advantageous in regard to achieving a higher energy yield per area of blade as the blade has a smaller risk of being deflected by the wind forces acting on the blade.

This may be further advantageous in regard to extending the length of the blades for higher energy yield per wind turbine or per blade. Blade length is a bottleneck and one of the most import factors in the development of rotor size and therefore a critical factor for the entire wind turbine generator (WTG) development today.

Furthermore the increased strength, stiffness and/or toughness for a comparable blade using a functionalized graphene-containing material compared to using a non-graphene-containing material may be advantageous in regard to that a reduced deflection/bending of the blade may achieve for reduced fatigue and thus prolonged lifetime. Further advantages may be mitigating the risk of cracks in the blades and/or in general achieving more damage-tolerant blades. Mitigating the risk of damages or increasing the damage-tolerance may generally result in reduced service costs and extend lifetime.

In one aspect the two-dimensional structure of graphene sheets may considerably reduce the cracks to emerge and/or develop thereby reducing service costs and extend lifetime.

One effect of the embodiment comprising a blade structure comprising a functionalized graphene-containing material may be that the weight of the blade with a comparable strength, stiffness and/or toughness of the blade to a blade using a non-graphene-containing material may be reduced. This achieves for new designs of the blades. New designs of the blades may include features such as a changed weight distribution of the blade, new blade profile as a few examples, however, by no means limited to these examples. New blade profiles and changed weigh distribution may be advantageous in regard to achieving a change in the centrifugal forces acting on the wind turbine caused by the rotation of the blades. It may be further advantageous in regard to achieving increased aerodynamic efficiency of the blades.

The functionalized graphene-containing material may be comprised in the load-carrying spar. The functionalized graphene-containing material may be comprised in the shell structure. The functionalized graphene-containing material may be comprised in the blade structure to form part of the surface. The functionalized graphene-containing material may be comprised in any combination of the above parts.

Comprising functionalized graphene-containing material in only a single part may have the effect that the weight of that part of the blade may be reduce while maintaining or improving properties for the entire blade such as strength, stiffness, toughness and/or flexibility compared to a blade using a non-graphene-containing material. This may be advantages in regard to that a reduced deflection/bending of the part and/or the entire blade may achieve for reduced fatigue and thus prolonged lifetime. Further advantages may be mitigating the risk of cracks in the part and/or the entire blade in general achieving more damage-tolerant blades. Mitigating the risk of damages or increasing the damage-tolerance may generally result in reduced service costs and extend lifetime.

Comprising functionalized graphene-containing material in any combination of parts may have the effect that the weight of one or more parts may be reduced to achieve sufficient strength, stiffness, toughness and/or flexibility of the entire blade compared to a blade using a non-graphene-containing material part of the blade. This may have the above mentioned advantages of reduced deflection/bending and/or mitigated risk of cracks in the one part, multiple parts or the entire blade. This may be additional effects and advantages compared to those already described.

In general, this may achieve for new designs of the blades, as the change in one or more parts of the blade may affect changes in other parts of the blade for achieving the aimed properties of the entire blade.

The shell structure may comprise multiple shell parts. These parts may comprise their own individual matrix of materials.

The functionalized graphene-containing material may be comprised in the load-carrying spar, in the entire shell structure, in a single shell part, or any combination thereof.

The percentage and type of functionalized graphene-based material comprised in the one or more of the parts may differ for each part depending on the properties to be achieved to that part and/or depending on the matrix of materials for that part.

The percentage and type of functionalized graphene-based material comprised in a dedicated area or volume in each part may also differ depending on the properties to be achieved to that location and part depending on the matrix of materials for that location/part.

These above-mentioned variations may be further advantageous in regard to a great freedom for designing the wind turbine blade thereby achieving wind turbine blades with specific properties in designated areas of the blade, with an advantageous weight distribution and optimized blade profile.

The leading edge of a wind turbine blade is the region of the blade that typically experiences the highest level of erosion, as this is the edge that cuts through the air. The shell structure and/or the surface may thus be constructed with properties aiming at mitigating the occurrence and or development of erosion in this part for prolonged lifetime of the wind turbine blade.

In one embodiment of the wind turbine blade a conductive structure extends from a dedicated blade area to a blade root of the wind turbine blade, wherein at least part of the conductive structure is formed by the blade structure.

The conductive structure may be partly or fully formed by the blade structure because the functionalized graphene-containing material comprised in the blade structure may provide a conductive material thereby forming a conductive structure.

The conductive structure may comprise additional conductive structures forming further connections where the blade structure only forms part of the conductive structure.

In one aspect the conductive structure is partly formed by the surface.

In one aspect, the dedicated blade area may be the blade tip.

In one aspect the additional conductive structures may be formed by the load-carrying spar.

In case the conductive structure is fully formed by the blade structure the embodiment may have the effect that a complete conductor system can be achieved without incorporating further structures to the wind turbine blade. This may provide for a conductor system which is protected for reduced wear and tear.

One effect of this embodiment may be to incorporate a lightning conductor system by use of functionalized graphene-containing material in the blade structure. This may be advantageous in regard to achieving new ways to design lightening protection systems.

A further effect of the embodiment may be that the conductor system may be designed with an increased lightening conductivity by increasing the percentage of functionalized graphene-based material or the type of functionalized graphene-based material in the functionalized graphene-containing material in the shell structure, in specific areas of the shell structure or even in the load-carrying spar. This may have the advantage of achieving more efficient and/or safer lightning conductor system The lightning conductor system may achieve improved lightning strike prevention, improved resistance to lightning, ability to act as lightning rods to divert lightning away from vulnerable areas amongst other benefits.

One effect of this embodiment may be to incorporate an electro-static conductor system by use of functionalized graphene-containing material in the blade structure.

This may be advantageous in regard to achieving new ways to design electro-static conductor systems.

A further effect of the embodiment may be that the conductor system may be designed with improved electro-static properties by increasing the percentage of functionalized graphene-based material or the type of functionalized graphene-based material in the functionalized graphene-containing material in specific areas of the blade structure. This may provide for improved electro-static ability to act as anti-static roots to discharge and divert anti-static away from vulnerable areas.

In one aspect the electricity conducting structure formed by the blade structure may be used for heating purposes for de-icing purposes. Functionalized graphene containing material may have both a high electrical and heat conducting capacity making it suitable for de-icing systems.

In one aspect the conductive structure is connected to a controlled power source which is powered on/off according to defined climatic conditions. One effect of this embodiment may be achieving de-icing system which may be activated when there is icing on the blades. Another effect may be achieving a de-icing system which may be activated under certain climatic conditions to prevent icing to accumulate on the blades.

This may be advantageous in regard to achieving a low energy consuming de-icing system for wind turbine blades, where the passage of an electric current through a conductor produces heat, also known as Joule heating, Ohmic heating or resistive heating.

A further advantage may be that no or considerably less operational time with reduction of power curve due to icing on the blades is achieved.

Yet a further advantage may be that no or considerably less safety risk due to ice being thrown of the blades is achieved.

Yet a further advantage may be that no or considerably less non-operational time where the wind turbines are shut down due to icing on the blades is achieved.

Ice presents a major problem for wind turbine blades in cold climates. There is great potential for wind energy in those environments due to the favourable conditions. Available wind power in cold climates is approximately 10% higher than in other areas due to the increased air density at lower temperatures, and according to recent estimates, 45 to 50 GW of power will be installed in low-temperature regions by 2017.

In a further embodiment of the wind turbine blade the blade structure comprises a surface which comprises functionalized graphene-containing material providing a functional surface area.

In one aspect the functional surface area may be light absorbing.

In one aspect the functional surface area may be radar-absorbent.

In one aspect the functional surface area may be heat- or electrical conductive.

In one aspect the functional surface area provide may be wear resistant, thereby meaning having an improved wear resistance compared to a surface area, where non-graphene-containing material is used.

In one aspect the functional surface area may be hydrophobic.

In one aspect the functional surface may have a flush surface.

In one aspect the functional surface may be structured.

Controlling the surface roughness may enable higher aerodynamic efficiency of the blades, which may be translated into a higher energy production from the wind turbine generator.

Hence, the surface may comprise multiple functionalized graphene-containing materials. These may be arranged in a multi-layered structure providing a functional surface area.

In one aspect the multi-layered structure may be a pre-fabricated structure which is applied as part of the blade structure and thereby forms part of the surface.

In one embodiment of the wind turbine blade the surface comprises a multi-layered structure configured with at least one functional layer containing functionalized graphene-containing material, said multi-layered structure provides a functional surface area.

One effect of the embodiment may be that the layered structure may provide a surface functionality not present in the top layer in itself. The surface functionality may be caused from another layer in the structure. This may have the advantage of obtaining a top layer acting for example as a protective layer for another layer in the layered structure.

In one aspect the top layer may be the functional layer containing functionalized graphene-containing material.

In another aspect a functional layer containing functionalized graphene-containing material, may be a different layer that the top layer.

In one embodiment of the wind turbine blade comprising a multi-layered structure as part of the surface, the multi-layered structure may be a sandwich structure comprising multiple functional layers, with at least one functional layer having a functionality being different from the functionality of another functional layer.

One effect of this embodiment may be that a multifunctional surface may be achieved. Such a multifunctional surface may be impossible to achieve using a single functional layer, because the graphene structures giving the different layer functionalities may not be compatible together in the same matrix material.

Multiple layer functionalities may per nature of the layer functionality not be incorporated in one layer. One exemplary embodiment could be a functional layer being stretchable and another layer having high mechanical stability which could be relevant for use on a substrate with a high thermal expansion coefficient.

Another effect may be that one of the layer functionalities are enhanced by incorporating an additional functional layer with a different layer functionality. One exemplary embodiment could be a functional top layer with a high wearability or high environmental resistance in combination with a functional intermediate layer which is resilient or shock-absorbing. This combination may result in an enhanced wearability or environmental resistance of the outer surface due to decreasing the influence of impacting forces on the outer surface.

In one embodiment of the wind turbine blade comprising a multi-layered structure as part of the surface, the top layer may be made of a resin. In a cured state the top layer may have a thickness in the range of 100-1000 μm (1E-6 m), preferably in the range of 100-500 μm or even more preferably in the range of 200-400 μm. The multi-layered structure may comprise a bottom layer made of a resin. In a cured state the additional layer may have a thickness in the range of 200-500 μm, preferably in the range of 50-300 μm or even more preferably in the range of 70-150 μm.

The thickness of the single layers may be chosen according to the application and the level of functionality. For example a high-voltage application may be implemented using a layer with a thickness in the millimetre to centimetre range.

In one aspect the layers may be made of polymers. The functional layers may be polymer layers, where the functionalized graphene-based materials are mixed into the resin.

In one exemplary embodiment of the wind turbine blade comprising a multi-layered structure as part of the surface, the multi-layered structure may comprise a top layer made of thermoplastic polyurethane, a bottom layer made of polyethylene and at least two intermediate layers arranged between the top layer and the bottom layer.

In one aspect, the intermediate layers may be a functional layer comprising a non-graphene-containing material. In one aspect, the intermediate layers may be made of a non-graphene-containing material. Hence, a material not comprising functionalized graphene-based materials. In another aspect, the intermediate layers may be a combination of the above. Intermediate layers made of a non-graphene-containing material may contribute with further functionalities to the surface area, hence, which do not originate from any functionalized graphene-based materials.

In one aspect, the intermediate layer may comprise printed and/or imprinted structures, which may be reproduced or partly reproduced in the functional surface.

Another exemplary embodiment with an intermediate layer having a functionality may comprise a resilient layer. A resilient layer may be obtained without using a functionalized graphene-containing material: in combination with a functional top layer with a high wearability or high environmental resistance, an enhanced wearability or environmental resistance of the outer surface may be achieved.

Yet another exemplary embodiment may be a non-conductive intermediate layer arranged between two conductive functional layers. The non-conductive layer may have the effect of avoiding shortcuts and/or other interaction between the two conductive functional layers.

One advantage of using a non-graphene-containing material may be possibility of using off-the-shelf materials which may reduce costs for making the layered structure compared to using functionalized graphene-containing material. Another advantage may be easier and continuous availability of off-the-shelf materials compared to functionalized graphene-containing materials.

In one exemplary embodiment the multi-layered structure may comprise five layers, a top layer, a bottom layer and three intermediate layers. The multi-layered structure may accommodate a surface being super hydrophobic and particle repellant. The top layer may be a transparent mat polymer film with a thickness in the range 300 μm. The intermediate layer adjacent to the top layer may accommodate a functional layer being light-absorbing and thus, with a reduced light reflectance back to the top layer. The intermediate layer, adjacent to the light-absorbing layer, may be a conductive functional layer accommodating for Joule heating to support a de-icing functionality. The next intermediate layer, being the layer between the conductive functional layer and the bottom layer may accommodate a functional layer being an organic solar cell or a photovoltaic. This layer may provide for power delivery to the Joule heating and thus the de-icing functionality. The bottom layer may have an adhesive effect.

In one exemplary embodiment the multi-layered structure may comprise six layers, a top layer, a bottom layer and four intermediate layers. The multi-layered structure may accommodate a surface being super environmentally resistant. The top layer may be a transparent elastic mat polymer film with a thickness in the range of 300 μm. The intermediate layer adjacent to the top layer may be flexible and impact-absorbing. This may be provided by a 60 μm transparent acrylic PSA film. However, other polymer films may also be used. The impact-absorbing layer may cause the functional surface area to provide for a functional surface area being super environmentally resistant. This may be due to dampening the impacts of particles inflicting on the surface area. The remaining four layers of the layered structure—the three remaining intermediate layers and the bottom layer—may be a structure similar to that described for the multi-layered structure, possibly accommodating a surface being super hydrophobic and particle repellant, with a functional layer being light-absorbing, a conductive functional layer accommodating for Joule heating to support a de-icing functionality, a functional layer being an organic solar cell or a photovoltaics layer, and the bottom layer may have an adhesive effect.

In one embodiment a wind turbine blade surface may comprise two or more multi-layered structures. The multi-layered structures may each provide a functional surface area. At least one functional surface area may have a functionality being different from the functionality of another functional surface area.

One effect of this embodiment may be that the surface may be provided with multiple functional surface areas being different from each other, thereby optimizing the blades according to their use and location. Especially the leading edge of a wind turbine blade experiences a high level of erosion, as this is the edge that cuts through the air.

In one exemplary embodiment the six-layered and five-layered structures described above may be applied to a wind turbine blade. The six-layered structure may be applied to the leading edge accommodating for a surface being super environmentally resistant. In combination with that the five-layered structure may be applied to remaining areas of the wind turbine blade, accommodating for a surface being super hydrophobic and particle repellant, this means that a surface may be achieved with multiple functional surface areas having different functionalities according to the use.

In a further embodiment of the wind turbine blade the blade structure comprises a surface which comprises functionalized graphene-containing material providing a hydrophobic surface.

One effect of this embodiment may be to mitigating building up a surface adhering water layer on the blade surface This may be advantageous in regard to preventing excess weight on the blade from a thin layer of water thereby preventing a reduction in the power curve of the wind turbine.

A similar effect of this embodiment may be to mitigate the build-up of ice on the surface of the blade thereby achieving no or considerably less need for de-icing of the blade. A further advantage may be no or considerably less operational time with reduction of power curve due to icing on the blades. Yet a further advantage may be no or considerably less safety risk due to ice being thrown of the blades. Yet a further advantage may be no or considerably less Non-operational time where the wind turbines are shut down due to icing on the blades.

In a further embodiment of the wind turbine blade the shell structure, or part of the shell structure, comprises a surface coating which comprises a functionalized graphene-containing material providing a light absorbing surface.

One effect of this embodiment may be to considerably reduce or completely eliminate light reflections from the blade on a wind turbine during the rotation of the blades, which is a major issue of concern for on-shore turbines located in inhabited areas.

A may have the advantage that no or considerably less visual pollution from wind turbines may be achieved. This is especially advantageous in regard to achieving new locations for on-shore wind turbines closer to inhabited areas.

A further advantage may be no or considerably less non-operational time is achieved where the wind turbines are shut down due to light reflections from the blades.

In a further embodiment of the wind turbine blade the shell structure, or part of the shell structure, comprises a surface coating which comprises a functionalized graphene-containing material providing a radar-absorbent surface.

One effect of this embodiment may be to considerably reduce or completely eliminate radar reflections from the blade on a wind turbine during the rotation of the blades to make them less visible (ideally invisible) to radar, which is a major issue of concern for wind turbines located close to airports and other sensitive areas. One of the main problems related to wind turbine blades is that they are extremely reflective to radar energy. This energy can cause problems not only for the radar, but also for the radar operators watching the display.

It may have the advantage that no or considerably less radar pollution from wind turbines may be achieved. The existing and new wind turbine blades surface can be modified so that it is less visible to the radar and hence causes fewer radar display plots. This is especially advantageous in regard to achieving new locations for wind turbines closer to airports areas and other sensitive areas.

A further advantage may be no or considerably less non-operational time is achieved where the wind turbines are shut down due to radar reflections from the blades.

In a further embodiment of the wind turbine blade the shell structure comprises a surface, or part of the surface, which comprises a functionalized graphene-containing material providing a wear resistant surface.

One effect of this embodiment may be to improve the anti-erosion and/or durability properties. This may have the advantage to prevent or at least reduce erosion of the leading edge of the blade also referred to as leading edge erosion.

Erosion of the leading blade edge may be a significant problem on off shore wind farms and on onshore wind farms located in sandy areas since the power curve is considerably reduced when leading edge erosion changes the roughness of the surface and the wind turbine have to be taken out of operation for maintenance.

The advantage of maintaining or improving a given smoothness of the leading edge and/or the entire blade surface may generally improve the power curve. A maintained or improved smoothness of at least part of the blade may improve the power curve under certain weather conditions. A maintained or improved smoothness of at least part of the blade may reduce noise emission from the blades in general and/or under certain weather conditions.

In one aspect, the functionalized graphene-containing material comprised in the surface may provide for general improved barrier properties of the surface such as a hydrophobic surface, a wear resistant surface and/or an environmental resistant surface.

One effect of this embodiment may be improved barrier properties of the surface may be to prevent dirt, salt, and/or insects amongst others from sticking to the surface. One advantage may be to mitigate excess weight on the blade or imbalance from different wear patterns on the surface and/or a layer of contaminations.

Another advantage may be to prevent no or less reduction of the power curve due to contaminations on the blade surface, thereby increasing yearly production from the wind turbine.

Yet another advantage may be reduced cost for cleaning the blades, thereby eliminating or reducing downtime for cleaning the blades, thereby increasing yearly output from the wind turbine.

In one embodiment of the wind turbine blade functionalized graphene-containing material may be chosen amongst: a resin, a polymer, an epoxy, a coating, foam, paint, liquid, ink, tape, combinations thereof, or a matrix comprising one or more thereof.

Tape may comprise a foil, a film, a sheet or comparable structures and thus be comparable to such structures. The tape may comprise a multi-layered structure such as at least an adhesive layer and a top layer. The tape may comprise additional layers in between the adhesive layer and the top layer.

In one aspect parts of the multi-layered structure may be extruded or produced by comparative processes or concepts.

In one aspect functionalized graphene-based material may be mixed into a matrix of intermediary or host/carrier materials.

In one aspect the functionalized graphene-based material may be in dry powder form including granulate or other dry forms.

In one aspect the functionalized graphene-based material may be in liquid form.

In one aspect the functionalized graphene-based material may be an ink.

As previously described, correctly functionalized graphene-based material has a unique ability to give its attributes to intermediary or host/carrier materials to which it bonds, thereby achieving the effects and advantages previously described for the wind turbine blade comprising a functionalized graphene-containing material.

The functionalized graphene-containing material may be a matrix of additive materials containing functionalized graphene-based material which can be used in material compositions to significantly improve mechanical and physical properties.

One effect of the embodiment may be that the functionalized graphene-containing material may be materials at least suited for wind turbine blades, thereby achieving that the design of the wind turbine blades is not limited by one or two materials. Instead a broad range of designs may be possible choosing the functionalized graphene-containing material according to the properties to be obtained.

An object of the invention may be achieved by use of functionalized graphene-containing material in a shell structure of a wind turbine blade.

An object of the invention may be achieved by use of functionalized graphene-containing material in a load-carrying spar of a wind turbine blade.

The shell structure and/or the load-carrying spar of a wind turbine blade are often made using a combination of several composite materials, making production significant complex, as each material will behave differently at each temperature. Even with careful control, you run the risk of exceeding the heat capability of one or more of the materials, destroying the blade's structural integrity before it even goes into use. The process by which the polymer matrix component hardens, and/or the effectiveness of this process, may have a huge impact on the strength of the final composite. This may also affect the functionalized graphene-containing material and the properties thereof. Use of functionalized graphene-containing material may provide for better terminal conductivity this may be advantageous in regard to achieving optimized formation of chemical bonds in the manufacturing process, and thus improved final performance of the blades.

Use of functionalized graphene-containing material may also provide for better electrical conductivity. This may be advantageous in regard to achieving a low energy consuming heating system, where the passage of an electric current through a conductor produces heat, also known as Joule heating, Ohmic heating or resistive heating. This may be advantageous in regard to achieving optimized formation of chemical bonds in the manufacturing process, and thus improved final performance of the blades.

The effects and advantages of the use of a functionalized graphene-containing material in the shell structure or in the load-carrying spar may be in line with those previously described and includes amongst others:

Increased terminal conductivity, which may be important in the manufacturing process
Providing an electrical conducive material
Increased lightning conducting properties
Increased electro-static properties
Increased strength, stiffness and toughness
Improved impact resistance
Thereby achieving amongst others the following advantages:
Improved fire retardation
Faster moulding time due to faster temperature equilibrium.
Less laminating time and reduced process costs
Increased resistance to delamination
Weight savings
Reduced material costs
Reduced exothermic and micro cracking during fabrication
Enabling thicker section mouldings and manufacture of thicker structures
More homogeneous and better part quality Increased damage tolerance May be used for de-icing purposes Ability to act as lightning rods to divert lightning away from vulnerable areas Ability to act as anti-electro-static rods to discharge and divert electro-static away from vulnerable areas Ability to act as a light absorbing surface Ability to act as a Radar-absorbent surface.

An object of the invention may be achieved by use of functionalized graphene-containing material in a surface coating of a wind turbine blade.

In one aspect, the surface coating may be paint.

In one aspect the surface coating may be ink.

In one aspect the surface coating may be tape.

In one aspect the surface coating may be a blade coating and/or a gel coat systems.

In one aspect, the surface coating may be in a liquid form with a suitable viscosity hardening by itself or by introducing an external hardening accelerator.

Hence, the surface may comprise multiple functionalized graphene-containing materials. These may be arranged in a multi-layered structure providing a functional surface area.

In one aspect the multi-layered structure may be a pre-fabricated structure which is applied as part of the blade structure and thereby forms part of the surface.

One effect of these uses may be that the shell structure may be covered using different coating thickness or different percentages of functionalized graphene-based material or different types of functionalized graphene-based material in the functionalized graphene-containing material used in specific areas of the blade, thereby achieving individual properties for individual areas.

Another effect may be that the shell structure may be covered by applying different functionalized graphene-containing material on different locations/areas of the blade depending on the wanted functionality.

Use of a functionalized graphene-containing material may also provide for better electrical conductivity. This may be advantageous in regard to achieving a low energy consuming heating system, where the passage of an electric current through a conductor produces heat, also known as Joule heating, Ohmic heating or resistive heating. This may be advantageous in regard to achieving optimized fit to the blade shells and formation of chemical bonds in a hardening process, and thus improved final performance and longevity of the surface coating system.

The effects and advantages of the use of a functionalized graphene-containing material in a surface coating may be in line with those previously described in connection with the surface properties of the invention.

An object of the invention may be achieved by a method for retrofitting a blade structure of a wind turbine blade, the method comprising an act of applying a functionalized graphene-containing material to a surface area of the wind turbine blade.

In one aspect the functionalized graphene-containing material may be a blade coating, a gel coat systems and/or a liquid.

In further embodiments the use of functionalized graphene-containing material may be combined by using it in any combination of a shell structure, a load-carrying spar and/or a surface coating or in all three parts.

The use of functionalized graphene-containing material in multiple parts of a wind turbine blade may have the effect that the weight of one or more parts may be reduced to achieve sufficient strength, stiffness, toughness and/or flexibility of the entire blade compared to a blade using a non-graphene-containing material part of the blade. This may have the above mentioned advantages of reduced deflection/bending and/or mitigated risk of cracks in the one part, multiple parts or the entire blade.

This may be additional effects and advantages compared to those already described for the individual use.

In general, this may achieve for new designs of the blades, as the change in one or more parts of the blade may affect changes in other parts of the blade for achieving the aimed properties of the entire blade.

In one aspect the retrofitting may be a method applied for new blades or existing blades.

In one aspect the retrofitting may include repair of existing blades.

The functionalized graphene-containing material may be applied by spraying functionalized graphene-containing material in liquid form onto the blade surface or by applying a functionalized graphene-containing material to the surface of the shell structure or on top of the existing surface or parts hereof. One effect of this embodiment may be that the shell structure may be retrofitted using different coating thickness, different percentages of functionalized graphene-based material in the functionalized graphene-containing material, and/or different types of functionalized graphene-based material in the functionalized graphene-containing material used in specific areas of the blade structure.

Another effect may be that the shell structure may be retrofitted by applying the functionalized graphene-containing material on different locations/areas of the blade depending on the wanted functionality.

Use of a functionalized graphene-containing material may also provide for better electrical conductivity. This may be advantageous in regard to achieving a low energy consuming heating system, where the passage of an electric current through a conductor produces heat, also known as Joule heating, Ohmic heating or resistive heating. This may be advantageous in regard to achieving optimized fit and formation of chemical bonds in a hardening process, and thus improved final performance of the repair system.

The effects and advantages of the retrofitting may be in line with those previously described in connection with the shell structure properties and surface properties of the invention.

In a specific embodiment of the method for retrofitting a blade structure of a wind turbine blade with the effects and advantages in line with those just described, the method may comprise an act of applying a tape with a multi-layered structure configured with at least one functional layer containing functionalized graphene-containing material.

This embodiment may have the effect of an off-the-self tape providing different surface functionalities. Thus, different areas of the wind turbine blade may be retrofitted with different surface functionalities. Hence, the surface being modified for surroundings, having different impacts on the surface.

Furthermore, the adhesive properties may be made suitable for specific substrate faces in regard to the material types comprised in the existing surface of the blades.

Additionally, this embodiment may have the effect that the attachment of the layered structure may be performed without health risks due to hazardous substances, e.g. aerosols being released or created in the attachment process.

In the pursuit for increased energy output, the development in wind turbines continues as mentioned includes all components in the wind turbine to be subject for enhancements and the location of the wind turbines.

Thus, a further advantage may be no or considerably less visual pollution from existing wind turbines if surface coatings comprising a functionalized graphene-containing material is retrofitted to blades on existing wind turbines. The retrofitting system where new gelcoat, tape, paint, liquid or ink may be added on the existing surface or part of the existing surface.

A repair system or retrofitting system may comprise a gelcoat, tape, paint, liquid or ink to be added on the leading edge of the wind turbine blade which may lead to an improved surface roughness or smoothness and a slower degrading surface. An improved surface roughness or smoothness of at least part of the blade may improve the power curve under certain weather conditions. An improved surface roughness or smoothness of at least part of the blade may also reduce noise emission from the blades in general and/or under certain weather conditions.

A further object of the invention may be achieved by use of at least one sensor containing graphene arranged in the rotor of a wind turbine suitable for measuring mechanical movements.

A sensor containing graphene may comprise one or more graphene-containing materials, and where the sensor's measuring properties are achieved by using at least one graphene-comprising material.

The rotor of the wind turbine comprises the wind turbine blades. The rotor on a wind turbine harvest the energy from the wind, and therefore the rotor is often in popular terms described as the motor of a wind turbine.

The mechanical movements may include for low frequency movements, vibrations, and/or acceleration in the rotor.

Due to the properties of functionalized graphene-based materials and functionalized graphene-containing materials previously described including amongst others a large surface area, mechanical stability, highly conductive, tuneable electrical and optical properties, thin two dimensional structures, being stretchable. These properties may be used in a sensor containing graphene for accuracy, sensitivity and sensing speed thereby being useful for continuously monitoring of mechanical movements in existing and future wind turbine blades and rotors.

By locating a sensor containing graphene in at least one of the blades in the rotor of a wind turbine for measuring mechanical movements, it may be achievable to monitor mechanical movements in different parts of the rotor at a very high accuracy, with improved sensitivity and with increased sensing speed compared to non-graphene-containing material sensors. Thereby achieving to identify unwanted mechanical movements or changes in mechanical movements which may indicates faults in a rotor part which may be advantageous in regard to achieving greater equipment reliability and reduced risk.

It may also be achieved to monitoring the wind conditions hitting the entire rotor swept area on the individual wind turbines thereby achieving for diagnosing of for example blade damage, yaw misalignment of the rotor plane, the actual mechanical function, tolerances and adjustment of the blade pitch, pitch bearing failures and the behavior and the aerodynamic efficiency of individual rotor blades at any 360° position and of the entire rotor at any 360° position, this being an inexhaustible list.

A wind turbine rotor is made up of components integrated into a finely balanced construction designed to last for 20 years or more. Any damaged or faulty rotor blades can reduce overall productivity and result in premature wear and tear on turbine components and a significant drop in performance.

Therefore any unbalance in the rotor should be identified as soon as possible and any damage repaired before it deteriorates and becomes a serious problem leading to costly repairs, lost revenue or even catastrophic failure.

The sensor may also be used to optimize the aerodynamic efficiency of the individual blades and of the entire rotor and in consequence hereof obtaining the best possible generator power production and lowest loads to be within the specifications.

Wind farm operators and OEMs have been searching for a condition monitoring system for blades and rotors on individual wind turbines and on wind turbine fleets capable of detecting adverse conditions and predicting failures, in order to help minimize risks and prioritize preventive maintenance and repairs, including strain gauges, acoustics, lasers and thermography—but until now with limited success.

Therefore even though some parts of a wind turbine can be monitored, such as the gearbox, generator and main bearing, there is currently no real-time health overview and condition monitoring of blades and rotors on individual wind turbines and on wind turbine fleets beyond manual inspections, typically done once a year.

These aspects may be further achieved by a wind turbine concrete tower comprising a load-carrying structure extending vertically to a height, comprising functionalized graphene-containing material.

The term wind turbine concrete tower comprises wind turbine towers wherein a concrete structure is comprised in the tower, and which concrete structure has a function for the tower. This function may be load-carrying, a supporting structure, strength reinforcing structure, function as a surface shell or a surface coating. These are only a few examples and the function of the concrete structure is by no means limited to these.

The wind turbine concrete tower may—as a non-limiting example—be a concrete hybrid tower with concrete base and middle sections and steel top.

Functionalized graphene-containing material may encompass one or more functionalized graphene-containing material(s).

Within the last 3-5 years different concrete tower systems have been invented. Based on the experience of these systems, the expectations in the market is, that—even though the number of concrete towers today is low—there will be a rapid move from steel to concrete towers which is expected to be the winning WTG tower technology.

One effect of this embodiment may be improved strength of the tower with reduced weight per height meter. This may be advantageous in regard to achieving a reduction in the amount of concrete and/or the amount of steel reinforcement required of a tower of a given height and strength compared to previously suggested concrete towers.

This may further be advantageous in regard to allowing for adoption of higher, thinner and/or lighter concrete towers, allowing for new designs, reduced steel reinforcement and concrete consumption and improved environmental sustainability, including:

Enabling completely new concrete tower assembly systems and methods compared to traditional concrete towers, which furthermore may enable a completely new logistical puzzle, where the towers may not be too heavy and/or wide to pass under bridges, through tunnels, cross roads and bridges from production facility to the wind turbine site, thereby further reducing logistic costs considerably.

Enabling new concrete tower assembly systems and methods which may reduce the need for large cranes on production site and/or wind turbine site, thereby further reducing costs.

Enabling new concrete tower assembly systems and/or methods, which may offer considerably more strength to the towers themselves, thereby allowing for the opportunity to use new inventions of cranes "crawling" up and down on the tower structure when erecting and servicing the wind turbines. This may further reduce costs in the construction, servicing and/or maintenance phase(s).

Enabling concrete tower which may offer a welcome opportunity to introduce towers which is even higher than today.

A further effect of this embodiment may be improved stiffness and thereby improved stability of the tower. This may have the advantage of achieving extended lifetime of the tower. Some indications points in the direction of an extended life time of up to 60 years may be achieved compared to steel towers which may have lifetimes in the range of 20 years and traditional concrete towers which are considered to have lifetimes in the range of 40 years.

A further advantage improved stiffness and thereby improved stability of the tower may be mitigating unwanted movements and/or vibrations in the tower during the wind turbine start-up phase, in the operational phase and/or during the stop phase.

This may further be advantageous in regard to allowing for adoption of thinner, lighter and/or higher concrete towers, allowing for new designs, reduced concrete consumption and improved environmental sustainability, including:

Enabling a larger footprint base of the tower which then requires a much simpler and less costly foundation than for steel towers and also for traditional concrete towers without functionalized graphene-containing material.

A further effects of this embodiment may be increased terminal conductivity in the functionalized graphene-containing material and/or thereby the tower construction. This may be advantageous in the manufacturing process thereby achieving properties such as:

Faster hardening time during fabrication due to faster temperature equilibrium.

Increased resistance to delamination during fabrication

Reduced exothermic and micro cracking during fabrication

Enabling thicker section mouldings and manufacture of thicker structures

More homogeneous and better part quality

Reduced process costs, amongst others.

By reducing delamination, exothermic and micro cracking during fabrication, the development of micro-sized cracks in the load carrying concrete structure may be prevented or delayed considerably because nano-sized cracks are controlled before they develop into micro-sized cracks, which therefore further improve resistance to tensile stresses.

A further effect of this embodiment may be that the functionalized graphene-containing material provides for an electrical conducive material constituting an entire or part of an electrical conductive structure of the wind turbine concrete tower.

In one aspect the conductive structure may comprise additional conductive structures forming further connections where the functionalized graphene-containing material only forms part of the conductive structure.

In one aspect the conductive structure may be partly formed by the surface.

In one aspect, the functionalized graphene-containing material may constitute a dedicated area on the surface of the tower.

In one aspect, the functionalized graphene-containing material may be of different coating thickness or different percentages of functionalized graphene-based material or different types of functionalized graphene-based material in the functionalized graphene-containing material used in dedicated areas of the tower structure.

In case the conductive structure is fully formed by the functionalized graphene-containing material and/or the basic elements used in the tower structure the embodiment may have the effect that a complete conductor system is achieved without incorporating further structures to the wind turbine concrete tower. This may provide for a conductor system which is protected for reduced wear and tear.

One effect of this embodiment may be to incorporate a lightning conductor system by use of functionalized graphene-containing material in the tower structure and/or the tower surface.

This may be advantageous in regard to achieving new ways to design lightening protection systems.

A further effect of the embodiment may be that the conductor system may be designed with an increased lightening conductivity by increasing the amount of functionalized graphene-based material in the functionalized graphene-containing material in specific areas of the tower structure. This may have the advantage of achieving more efficient and/or safer lightning conductor system The lightning conductor system may achieve improved lightning strike prevention, improved resistance to lightning, ability to act as lightning rods to divert lightning away from blades, nacelle and/or other vulnerable areas.

One effect of this embodiment may be to incorporate an electro-static conductor system by use of functionalized graphene-containing material in the tower structure.

This embodiment may be further advantageous in regard to achieving new ways to design electro-static conductor systems.

A further effect of the embodiment may be that the conductor system may be designed with improved electro-static properties by increasing the amount of functionalized graphene-based material in the functionalized graphene-containing material in specific areas of the tower structure. This may provide for improved electro-static ability to act as anti-static rods to discharge and divert anti-static away from blades, nacelle and/or other vulnerable areas.

In one aspect the electricity conducting structure formed by the tower structure may be used for heating purposes for de-icing purposes. Functionalized graphene-containing material may have both a high electrical and heat conducting capacity making it suitable for de-icing systems.

In one aspect the conductive structure is connected to a controlled power source which is powered on/off according to defined climatic conditions. One effect of this embodiment may be achieving de-icing system which may be activated when there is icing on the tower. Another effect may be achieving a de-icing system which may be activated under certain climatic conditions to prevent icing to accumulate on the tower.

This may be advantageous in regard to achieving a low energy consuming de-icing system for wind turbine towers, where the passage of an electric current through a conductor produces heat, also known as Joule heating, Ohmic heating or resistive heating.

One further effect may be an increased toughness of the concrete offering advanced properties leading to improved such as fire retardation and/or a reduced level of maintenance leading to maintenance free towers.

In one aspect the functionalized graphene-containing material may provide for improved barrier properties of the surface such as hydrophobic surface.

This may have the effect of preventing build-up of a surface adhering water layer. This may lead to no or considerably less build-up of ice on the surface of the tower, which may achieve for:
- no or considerably less need for de-icing of tower
- no or considerably less safety risk due to ice being thrown of the tower
- no or considerably less non-operational time where the wind turbines are shut down due to icing on the tower.

In one aspect the functionalized graphene-containing material may provide for a conductive material.

Functionalized graphene-containing material may have both a high electrical and heat conducting capacity. The effects and advantages of these properties are in line with those already described previously for both wind turbine blades and towers.

In a further embodiment of the wind turbine concrete tower the height is above 80 meters.

One effect of this embodiment is that for towers higher than 80 meters, concrete towers may be the most economical feasible solution compared to steel towers.

In general, concrete towers containing functionalized graphene-containing material may offer a welcome opportunity to increase the height of wind turbine towers. This may also lead to wind turbines with an increased size in rotors. It may further offer the possibility of raising rotors to a height where a better wind regime may be reach with the opportunity to capture more and/or stronger wind, and therefore increase the efficiency of the wind turbines and at the same time reduce the service costs over lifetime. A better wind regime may also include more continuous wind with reduced risk of turbulence and gusts arising.

A wind turbine tower with a height above 80 may have these above mentioned effects and advantages as a larger hub height of the rotor may achieve less turbulence in the wind turbine, stronger winds and more energy production—each meter gained in hub height is said to increases the yearly energy yield by 0.5-1%.

Generally tower heights both onshore and offshore are increasing based on this reason of achieving better wind regimes. Currently, tower heights now up to 150 meters are appearing. Onshore sites are moving more inland which means that the surroundings may have a significant influence on the wind regime. This may include forestry areas and/or hilly terrain. Thus one effect of increasing the tower height to above 80 meters may be to achieve better wind regimes onshore unheeded the surroundings with the mentioned advantages hereof.

In one embodiment of the wind turbine concrete tower, the surface may comprise a multi-layered structure configured with at least one functional layer containing functionalized graphene-containing material. The multi-layered structure may provide a functional surface area.

One effect of the embodiment may be that the layered structure may provide a surface functionality not present in the top layer in itself. The surface functionality may be caused from another layer in the structure. This may have the advantage of obtaining a top layer acting for example as a protective layer for another layer in the layered structure.

In one aspect the top layer may be the functional layer containing functionalized graphene-containing material, In another aspect a functional layer containing functionalized graphene-containing material, may be a different layer that the top layer.

In one aspect the multi-layered structure may be a sandwich structure comprising multiple functional layers, with at least one functional layer having a functionality being different from the functionality of another functional layer.

One effect of this embodiment may be that a multifunctional surface may be achieved. Such a multifunctional surface may be impossible to achieve using a single functional layer, because the graphene structures giving the different layer functionalities may not be compatible together in the same matrix material.

Multiple layer functionalities may per nature of the layer functionality not be incorporated in one layer. One exemplary embodiment could be a functional layer being stretchable and another layer having high mechanical stability which could be relevant for use on a substrate with a high thermal expansion coefficient.

Another effect may be that one of the layer functionalities are enhanced by incorporating an additional functional layer with different layer functionality. One exemplary embodiment could be a functional top layer with a high wearability or high environmental resistance in combination with a functional intermediate layer which is resilient or shock-absorbing. This combination may result in an enhanced wearability or environmental resistance of the outer surface due to decreasing the influence of impacting forces on the outer surface.

In general, the effects and advantages of a multi-layered structure comprised in the surface of the wind turbine concrete tower may be in line with those previously described for the wind turbine blade, comprising a multi-layered structure comprising a functionalized graphene-containing material as part of the surface.

An object of the invention may be achieved by use of functionalized graphene-containing material in a wind turbine concrete tower extending vertically to a height.

A further object of the invention may be achieved by use of functionalized graphene-containing material in a surface coating of a wind turbine tower extending vertically to a height.

In one aspect functionalized graphene-based material may be mixed into a matrix of intermediary or host/carrier materials.

In one aspect the functionalized graphene-based material may be in dry powder form, In one aspect the functionalized graphene-based material may be in liquid form.

In one aspect the functionalized graphene-based material may be an ink.

The effects and advantages of the use of functionalized graphene-containing material in the wind turbine concrete tower structure or in a surface coating of a wind turbine tower may be in line with those previously described for a wind turbine tower comprising a load carrying concrete structure extending vertically to a height, comprising a functionalized graphene-containing material.

Item: A wind turbine foundation comprising a load carrying concrete structure comprising functionalized graphene-containing material anchoring the concrete tower to the ground One effect may be the use of functionalized graphene-containing material in foundations may offer an opportunity to reduce the amount and/or weight of steel reinforcement A further effect may be increased terminal conductivity, which may be advantageous in a manufacturing process due to:
faster hardening time due to faster temperature equilibrium,
increased resistance to delamination during fabrication,
reduced exothermic and micro cracking during fabrication,
enabling thicker section mouldings and manufacture of thicker structures,
more homogeneous and better part quality,
reduced process costs, amongst others.

Further effect and advantages of the embodiment of this item may be in line with those described in relation to the embodiment of a wind turbine concrete tower comprising a load carrying concrete structure extending vertically to a height, comprising functionalized graphene-containing material concerning the material properties i.e. where the function of the units are comparable.

An object of the invention may be achieved by use of functionalized graphene-containing material in a repair system for wind turbine tower foundations.

A wind turbine may comprise a load carrying concrete structure and an imbedded steel reinforcement and a foundation where the foundation is connected to the bottom of the tower.

This embodiment may include repairing units where steel towers connected to a steel cylinder or foundation ring imbedded in the concrete foundation is dislocated or moves more than an acceptable distance relative to the concrete foundation The advantages of such a repair system may be a system with additional strength, additional flexibility and/or more suitable viscosity in use e.g. during application. The use of functionalized graphene-containing material in such a repair system may also provide for better electrical conductivity. This may be advantageous in regard to achieving a low energy consuming heating system, where the passage of an electric current through a conductor produces heat, also known as Joule heating, Ohmic heating or resistive heating. This may be advantageous in regard to achieving optimized fit and bonding of a suitable liquid repair system using a functionalized graphene-containing material with a suitable viscosity when followed by a heat driven hardening process as part of the repair process, and thus improved final performance of the repair system.

Item: Use of functionalized graphene-containing material in material mix for nacelle covers and/or spinner.

Effects and advantages of this embodiment may be in line with the previously described advantages for wind turbine blades and wind turbine concrete towers comprising functionalized graphene-containing material where the functions of the units are comparable.

Items:
Lightning and electro-static conductor system for existing and new wind turbines, in the blades (load-carrying web and/or the shell structure and/or the surface coatings), in the tower (load carrying concrete structure and/or the surface) and in the foundation (load carrying concrete structure and/or the surface) where at least one of these comprising a functionalized graphene-containing material, providing an conducive material.

De-icing system for existing and new wind turbines, in the blades (load-carrying web and/or the shell structure and/or the conductive surface coatings), in the tower (load carrying concrete structure and/or the surface) and in the foundation (load carrying concrete structure and/or the surface) where at least one of these comprising a functionalized graphene-containing material, providing an electrical conducive material where the passage of an electric current through this conductor produces heat, also known as Joule heating, Ohmic heating and resistive heating.

Surface coating/liquid/ink/etc. for existing and new wind turbines which comprises a functionalized graphene-containing material providing improved barrier properties of the surface such as a hydrophobic, wear resistant and environmental resistant surface providing completely new properties to all surface areas of wind turbines.

Increased strength, stiffness and toughness of the blade structure enabling longer, stiffer, lighter, more damage-tolerant, less service and maintenance demanding and more aerodynamic efficient blades when load-carrying web and/or the shell structure and/or the surface coatings comprising a functionalized graphene-containing material Increased strength, stiffness and toughness of the tower structure enabling longer, stiffer, lighter, more damage-tolerant, less service and maintenance demanding and longer lifetime for towers when load carrying concrete structure and/or the surface comprising a functionalized graphene-containing material Wind turbine concrete tower assembly systems and methods which compared to traditional concrete towers may:
reduce the amount of concrete and the amount of steel reinforcement required and thereby allow adoption of thinner and lighter concrete towers, allowing for new designs, reduced concrete consumption and improved environmental sustainability.
enable a completely new logistical puzzle of not being too heavy or wide to cross all the roads and bridges from production facility to the wind turbine site which again may reduce logistic costs considerably.
enable new concrete tower assembly systems and methods which may reduce the need for large cranes on site which again will reduce costs.
enable new concrete tower assembly systems and methods which may offer considerably more strength in the towers themselves and therefore also the opportunity to use new inventions of cranes "crawling" up and down on the tower structure when erecting and servicing the wind turbines which again will reduce costs and will also offer a welcome opportunity to introduce towers which is even higher than today.

Wind turbine concrete towers containing functionalized graphene-containing material may offer a welcome opportunity to make towers even higher to support bigger rotors and to get rotors up in a better wind regime and therefore capture more wind and therefore increase the efficiency of the wind turbines and at the same time reduce the service costs over lifetime.

In further embodiments the functionalized graphene-containing material may be comprised in any combination of two or more of the described parts of the wind turbine (blade, tower, rotor, foundation repair system) and/or in combination with the graphene-containing sensor.

Combining parts comprising functionalized graphene-containing material may have the effect that the weight of single parts of the wind turbine may be reduce while maintaining or improving properties for the entire wind turbine such as strength, stiffness, toughness, flexibility and/or functionalized surfaces compared to a wind turbine tower using non-graphene-containing material parts. This may be advantages in regard to that a reduced deflection/bending of the parts and/or the entire wind turbine may be achieve for reduced fatigue and thus prolonged lifetime. Further advantages may be mitigating the risk of cracks in the parts and/or the entire wind turbine in general achieving more damage-tolerant wind turbines. Mitigating the risk of damages or increasing the damage-tolerance may generally result in reduced service costs and extend lifetime.

In general, this may achieve for new designs of the wind turbines, as the change in some parts of the wind turbine may affect changes in other parts of the wind turbine for achieving the aimed properties of the entire wind turbine.

The further combination with the graphene-containing sensor may have an effect of a change in which mechanical properties to survey and/or how to measure such properties. This may further achieve for new designs of control systems used in wind turbines.

In further embodiments the use of functionalized graphene-containing material may be combined by using it in any combination of two or more of a blade structure, a wind turbine concrete tower, a surface coating of a wind turbine tower and/or repair system for wind turbine tower foundation.

The use of multiple functionalized graphene-containing material parts in a wind turbine may have the previously described effects achieved using a combination of multiple parts comprising functionalized graphene-containing material, but in this case for the entire wind turbine or dedicated areas of the wind turbine. In general, this may further achieve for new designs of the wind turbines, as the change in some parts of the wind turbine may affect changes in other parts of the wind turbine for achieving the aimed properties of the wind turbine. It may further achieve for new designs and implementation of how and/or where the wind turbine installation may be installed.

In general, by combining the apparatuses and use the effects described for the individual parts or use may be enhanced for a combination of parts.

DESCRIPTION OF THE DRAWING

FIG. 2: Illustration of a wind turbine blade.
FIG. 3: Illustration of two embodiments of a multi-layered structure.

DETAILED DESCRIPTION OF THE INVENTION

| No | Item |
|---|---|
| 10 | Wind turbine blade |
| 12 | Blade structure |
| 14 | Wind turbine |
| 20 | Shell structure |
| 21 | Multi-layered structure |
| 22 | Sandwich structure |
| 23 | Top layer |
| 24 | Intermediate layers |
| 25 | Bottom layer |
| 26 | Dedicated blade area |
| 27 | Functional surface area |
| 28 | Surface area |
| 29 | Layer thickness |
| 30 | Load-carrying spar |
| 40 | Functionalized graphene-containing material |
| 41 | Tape (film) |
| 42 | Graphene-based material |
| 44 | Functionalized graphene-based material |
| 46 | Host/carrier material |
| 47 | Functional layer |
| 48 | Functionality |
| 49 | Resilient layer |
| 50 | Blade root |
| 55 | Hub |
| 60 | Conductive structure |
| 70 | Surface |
| 72 | Hydrophobic surface |
| 73 | Conductive surface |
| 74 | Wear resistant surface |
| 75 | Light absorbing surface |
| 76 | Surface coating |
| 77 | Radar-absorbent surface |
| 80 | Wind turbine concrete tower |
| 81 | Wind turbine tower |
| 82 | Load carrying structure |
| 83 | Transition piece |
| 84 | Height |
| 85 | Nacelle |
| 86 | Repair system |
| 88 | Tower foundation |
| 90 | Sensor containing graphene |
| 91 | Rotor |
| 92 | Leading edge |
| 93 | Tailing edge |
| 94 | Suction side |
| 95 | Pressure side |
| 100 | Use |
| 200 | Method |
| 210 | Retrofitting |
| 301 | Hub height |
| 302 | Blade length |
| 310 | Soil |
| 312 | Mounting element |
| 314 | Foundation top flange |
| 400 | Method for functionalization |

Figure 1:
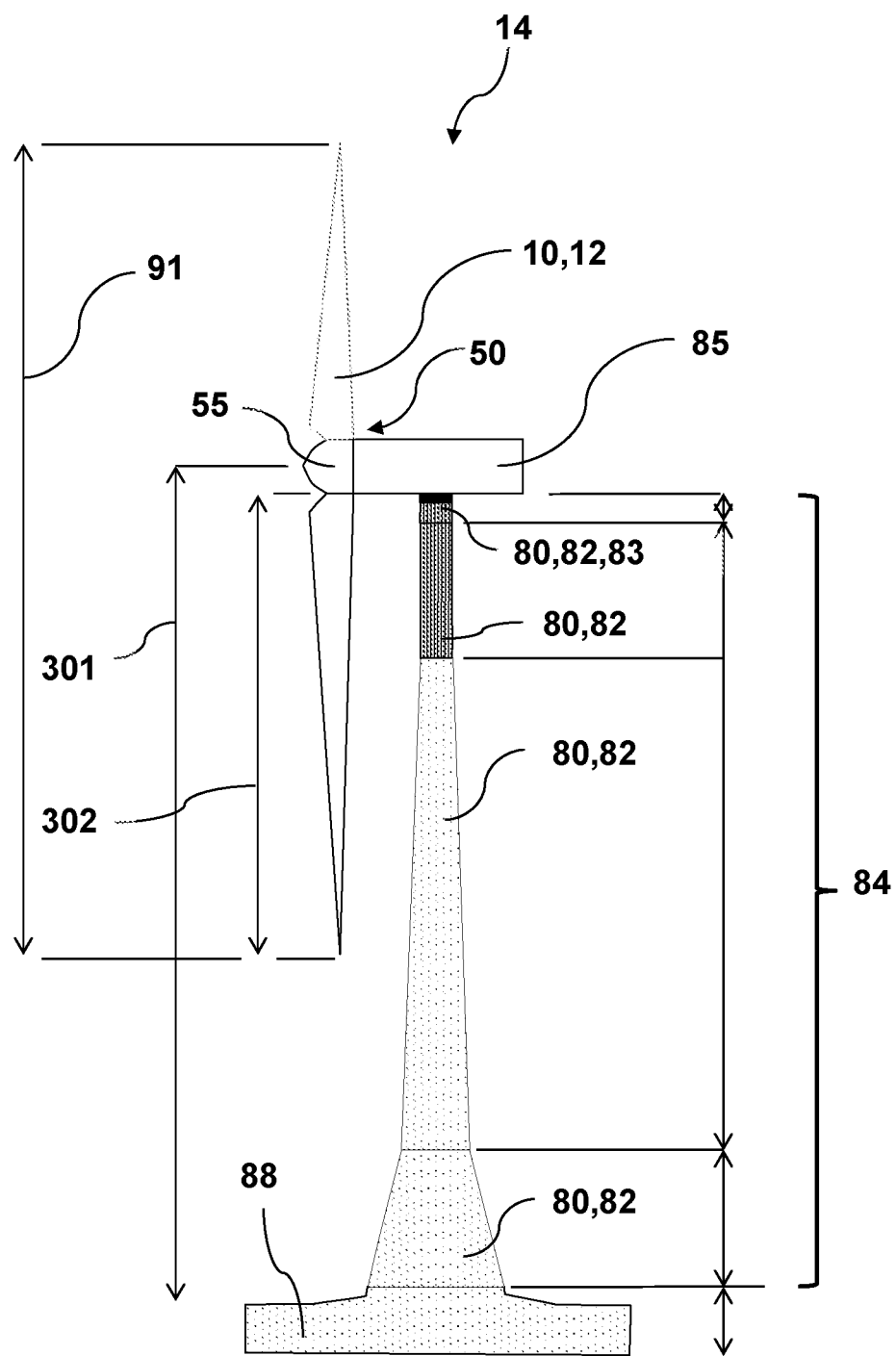
FIG. 1: Illustration of a wind turbine.

FIG. 1 illustrates a wind turbine 14 comprising a rotor 91, a nacelle, a tower 80 and foundation 88 for the wind turbine 14. The rotor 91 may comprise the wind turbine blades 10 comprising a blade structure 12, blade roots 50 and a hub 55. The nacelle 85 is illustrated with a cover. The illustrated embodiment comprises a wind turbine concrete tower 80 with a load-carrying structure 82. The load-carrying structure 82 constitutes a top part zone, a middle section zone and a base section zone. The middle section zone and the base section zone may be precast pre-stressed concrete shells. Alternatively the base section zone may be cast in situ. The top part of the tower is illustrated to comprise two sections which may comprise mainly steel elements. The upper section zone includes a transition piece 83. The transition piece 83 may be made in steel with flanges connecting to a yaw system and/or a nacelle 85. The upper section zone may comprise steel tubes or alternatively precast pre-stressed concrete shells.

The illustrated embodiment presents a hybrid concrete tower, which is referred to as a concrete tower 80 in this invention. The tower has a height 84 and the hub height 301 is illustrated along with the blade length 302. The hub height 301 differs from the tower height 84 by an additional height given by the hub 55.

FIGS. 2A, 2B and 2C illustrate a wind turbine blade 10. The wind turbine blade 10 comprises a blade structure 12 with a leading edge 92, a tailing edge 93, a suction side 94 and a pressure side 95. The leading edge 92 is that edge of a wind turbine blade 10 that cuts through the air. It is generally that region of the blade 10 which experiences the highest level of erosion.

The illustrated wind turbine blade 10 comprises a shell structure 20 and a load carrying spar 30. The wind turbine blade further comprises a surface 70.

In FIG. 2A the load carrying spar 30 is illustrated as a load carrying box. It may also be referred to as a load-carrying box, a main spar, a spar web, a load carrying web, amongst others.

In FIG. 2B the load carrying spar 30 is illustrated as a single load carrying structure. It may also be referred to as a main spar, a spar web, a load carrying web, amongst others. The blade structure may comprise a hydrophobic surface 72, a conductive surface 73, a wear resistant surface 74, a light absorbing surface 75 and/or a radar-absorbent surface 77. The blade structure may comprise a surface coating 76 which may constitute the surface 70.

In FIG. 2C the leading edge 92 of a wind turbine blade 10 is illustrated. The leading edge is part of the surface 70. The leading edge 92 is illustrated as two different areas. The extent of the leading edge may depend on the design of the blade and the specifications of the blade. The leading edge 92 may only refer to the outer-most tip part illustrated by the black area or it may extend more towards the rod of the blade illustrated by the black and white area.

FIG. 3A illustrates a layered structure 21 being a sandwich structure 22 with six layers. The layered structure 21 comprises a bottom layer 25, four intermediate layers 24 and a top layer 23. The layers each have individual film thicknesses 29.

In the illustrated embodiment, the top layer 23 and the intermediate layers 24 all have different functionalities and may accommodate a surface being super environmentally resistant. The top layer 23 provides for a hydrophobic 72 and wear resistant 74 surface. The intermediate layer 24 is a resilient layer 49. This layer's properties of being flexible and/or impact-absorbing may, in combination with the wear resistant top layer, add a further contribution to the wear resistance 74 of the functional surface and thus being super environmentally resistant. This may be due to dampening the impacts of particles inflicting on the surface area. The intermediate layer 24 adjacent to the resilient layer 49 may accommodate a functional layer 47 being light-absorbing 75 and thus, with a reduced light reflectance back to the top layer 23. The intermediate layer 24, adjacent to the light-absorbing layer 75, may be a conductive 73 functional layer 47 accommodating for Joule heating to support a de-icing functionality. The next intermediate layer 24, being the layer between the conductive functional layer 73 and the bottom layer 25 may accommodate an organic solar cell or a photovoltaic. This layer may provide a functionality 48 of delivering power to the Joule heating and thus the de-icing functionality.

FIG. 3B illustrates a layered structure 21 being a sandwich structure 22 with four layers. The layered structure 21 comprises a bottom layer 25, two intermediate layers 24 and a top layer 23.

In the illustrated embodiment, the top layer 23 and the intermediate layers 24 all have different functionalities and may accommodate a surface being super environmentally resistant. The top layer 23 provides for a hydrophobic 72 and wear resistant 74 surface.

The intermediate layer 24 adjacent to the top layer 23 is a functional layer 47 being radar absorbent and thus, accommodates for a radar absorbent surface 77. The intermediate layer 24 adjacent to the radar-absorbent layer 77 is also a functional layer. This layer could be absorbent for other wavelengths, be stretchable, add strength to the structure, provide conductive structures amongst others.

Figure 4:
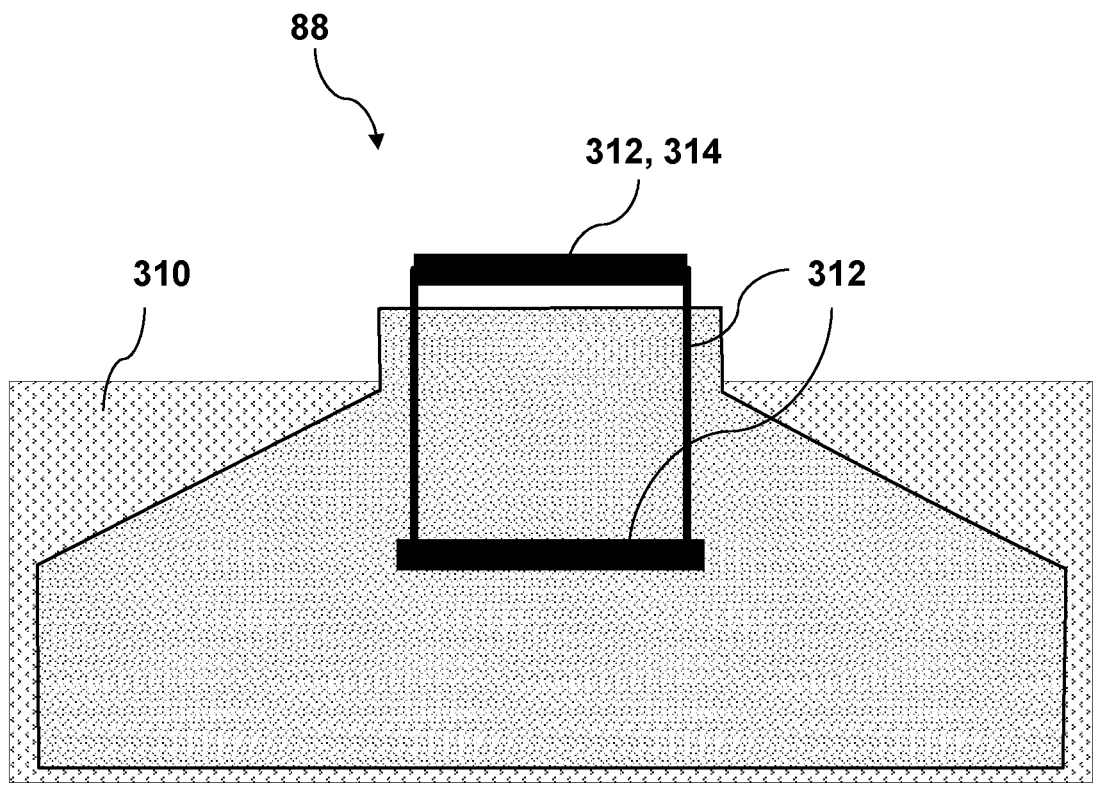
FIG. 4: Illustration of a typical foundation for a steel tower for a wind turbine.

FIG. 4 illustrates an embodiment of a tower foundation. The foundation is typically arranged in the soil 310 for on shore wind turbines. A typical foundation 88 for a steel tower for a wind turbine may comprise a mounting element 312 comprising T- and L-flanges and an embedded ring, where the L-flange may be connecting to the steel tower and may constitute the foundation top flange 314.

Figure 5:
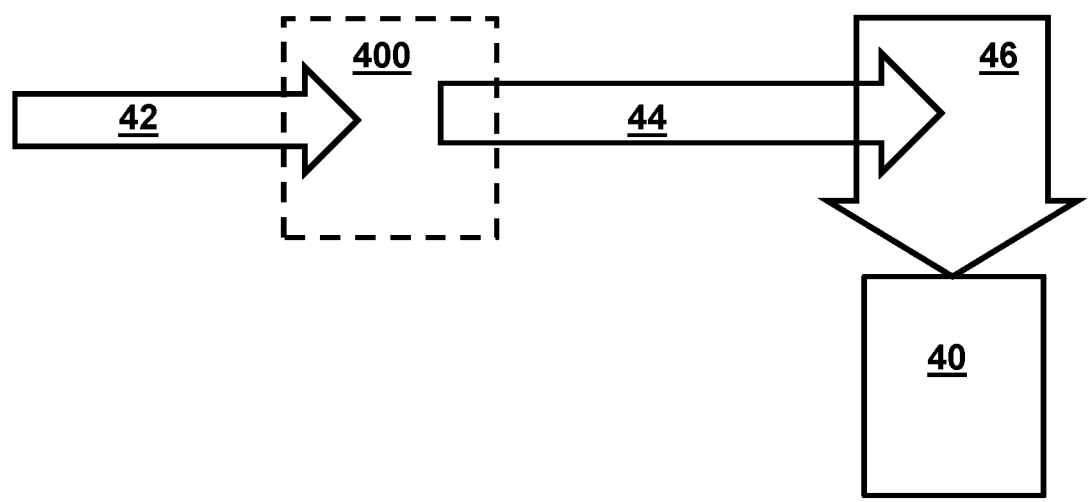
FIG. 5: Illustrating the road map to functionalized graphene-containing material

FIG. 5 illustrates the roadmap to reach functionalized graphene-containing material 40. Graphene-based material 42 is functionalized using a method or process for functionalization 400 resulting in a functionalized graphene-based material 44. The functionalized graphene-based material 44 is/are mixed with host/carrier material 46 resulting in functionalized graphene-containing material 40.

What is claimed is:

1. A wind turbine blade with a blade structure comprising:
   a surface including a functionalized graphene-containing material configured and arranged to provide a functional surface area; and
   a load-carrying spar configured and arranged to support a shell structure;
   wherein the functionalized graphene-containing material is part of a tape applied to the surface, and wherein the tape forms a conductor system configured and arranged to be connected to a controlled power source which is powered on/off according to defined climatic conditions, thereby achieving a de-icing system by resistive heating.

2. The wind turbine blade structure according to claim 1, wherein the surface further includes a multi-layered structure with at least one functional layer containing functionalized graphene-containing material forming the conductor system, said multi-layered structure configured and arranged to also provide the functional surface area.

3. The wind turbine blade structure according to claim 2, wherein the multi-layered structure is a sandwich structure including multiple functional layers, with at least one of the multiple functional layers configured and arranged to function different from another one of the other multiple functional layers.

4. The wind turbine blade structure according claim 2, wherein the multi-layered structure includes
   a top layer consisting of a resin and having a thickness in a cured state in the range of 100-1000 μm, and
   a bottom layer consisting of a resin and has a thickness in a cured state in the range of 200-500 μm.

5. The wind turbine blade structure of claim 2, wherein the multi-layered structure includes
   a top layer made of thermoplastic polyurethane,
   a bottom layer made of polyethylene, and
   at least two intermediate layers being functional layers arranged between the top and bottom layers.

6. The wind turbine blade structure of claim 2, wherein the surface further includes two or more multi-layered structures, said multi-layered structures are each configured and arranged to provide a functional surface area, and
   wherein at least one of the multiple functional surface areas is configured and arranged to have one function different from another one of the other multiple functional surface areas.

7. The wind turbine blade structure of claim 2, wherein a top layer of the multi-layered structure has a thickness in the cured state in the range of 100-500 µm, and a bottom layer of the multi-layered structure has a thickness in the cured state in the range of 50-300 µm.

8. The wind turbine blade structure of claim 2, wherein a top layer of the multi-layered structure has a thickness in the cured state in the range of 200-400 µm, and a bottom layer of the multi-layered structure has a thickness in the cured state in the range of 70-150 µm.

9. The wind turbine blade structure of claim 1, wherein the functionalized graphene-containing material of the surface is hydrophobic.

10. A method of retrofitting a wind turbine blade structure including the steps of:
applying a tape with a multi-layered structure including functionalized graphene-containing material to a surface area of the wind turbine blade,
wherein said functionalized graphene-containing material forms a conductor system for connection to a controlled power source which is powered on/off according to defined climatic conditions, thereby achieving a de-icing system by resistive heating.

11. A wind turbine concrete tower comprising:
a load-carrying structure extending vertically to a height, functionalized graphene-containing material,
a surface with a multi-layered structure configured with at least one functional layer containing the functionalized graphene-containing material, said multi-layered structure provides a functional surface area,
wherein the functionalized graphene-containing material is part of a tape applied to the surface; and
wherein said tape forms a conductor system connected to a controlled power source which is configured and arranged to be powered on/off according to defined climatic conditions, thereby achieving a de-icing system by resistive heating.

12. The wind turbine concrete tower according to claim 11, wherein the height is more than 80 meters.

* * * * *